United States Patent Office 3,441,535
Patented Apr. 29, 1969

3,441,535
TRANSPARENT REINFORCED COMPOSITIONS CONTAINING DIALLYL PHTHALATE PREPOLYMERS
Harry Hoyt Beacham, Severna Park, Md., Jerry M. Kreinik, Parkersburg, W. Va., and James Larue Thomas, Baltimore, Md., assignors to FMC Corporation, New York, N.Y., a corporation of Delaware
No Drawing. Filed May 19, 1967, Ser. No. 639,599
Int. Cl. C08f 21/00; B32b 17/06
U.S. Cl. 260—40      17 Claims

ABSTRACT OF THE DISCLOSURE

This specification discloses translucent reinforced, thermosetting plastic structures with improved transparency composed of diallyl phthalate or diallyl isophthalate polymers, a reactive monomer or a high maleic or fumaric unstaurated polyester resin that will copolymerize with the polymer, a glass coupling agent incorporated in the polymer-monomer mixture, reinforcing glass treated with a glass coupling agent and a polymerization catalyst to convert the polymer system to the cured state when heated. The polymer and monomer or polyester are mixed in a ratio so that when cured the refractive index of the polymer system will match the refractive index of the glass. An inhibitor for the allylic resins may be incorporated in the polymer-monomer mixture to promote the flow of the polymer system under cure conditions and reduce the exotherm.

BACKGROUND OF THE INVENTION

Field of the invention

This invention is concerned with the production of transparent, reinforced, plastic structures which are transparent and have good retention of clarity over long periods of time.

Description of the prior art

The need has existed for a resin or resin formulation which when combined with a reinforcing glass will produce a strong, tough, chemically resistant, transparent material which can be molded or laminated easily. The art has recognized for a number of years that reinforced plastic structures with improved transparency could be made by matching the refractive index of the plastic to that of the reinforcing glass. Unfortunately, most optical quality resins possess refractive indices appreciably lower than glass. A difference in refractive index between the glass and the resin causes poor clarity in the reinforced plastic construction.

Polystyrene, a thermoplastic resin, has a higher refractive index than glass. Styrene monomer will copolymerize with some thermosetting resins and glass reinforced plastic constructions have been prepared by blending styrene monomer with thermosetting resins to match the refractive index of the cured resin composition to the refractive index of the reinforcing glass. Methylmethacrylate, which has a desirable refractive index has also been evaluated in glass reinforced constructions in blends with styrene monomer.

United States Patent No. 2,944,994, issued to Singleton et al., discloses translucent polyester/styrene/glass compositions. Singleton's compositions match the refractive index of the cured resin system to the refractive index of the reinforcing glass. Singleton's resin systems contain relatively large amounts of styrene monomer. Styrene monomer shrinks considerably when it reacts with the polyester resin and the shrinkage causes the interface between the reinforcing glass and the resin system to open up and leave small voids where the resin has parted from the reinforcing glass. The voids at the interface between the reinforcing glass and the resin cause light scattering and opacity. The Singleton compositions are translucent, strong and tough initially; however, the high shrinkage causes these compositions to become cloudy as they age.

Summary of the invention

We have now discovered that translucent, glass reinforced, thermoset resin moldings and laminates with improved transparency can be prepared by making the molding compounds or laminates from reinforcing glass treated with a glass coupling agent and a resin composition which comprises (a) diallylic phthalate partial polymer, (b) a polymerizable liquid which may be a selected monomer or high maleic or fumaric polyester resin, that will copolymerize with the partial polymer, in an amount sufficient to match the refractive index of the cured polymer system to the refractive index of the reinforcing glass, (c) 1 to 5% of a glass coupling agent, by weight based on the total weight of the polymer system, and (d) a catalytic amount of organic peroxide. Our preferred thermosetting resin compositions also contain not more than 400 parts per million of an inhibitor, by weight based on the total weight of the polymer system.

Quite surprisingly, the presence of a glass coupling agent in the resin composition as well as on the reinforcing glass provides compositions that can be formed into transparent glass reinforced diallylic phthalate moldings and laminates that retain their clarity upon aging. Molding compositions useful in preparing transparent moldings are made by mixing glass fibers, flakes or ground glass on which a coupling agent has been applied into the novel diallylic phthalate resin composition and molding the composition under heat and pressure. Transparent laminates are made by impregnating glass roving, nonwoven glass mat or woven glass fabric on which a coupling agent has been applied with the diallylic phthalate resin composition and curing the laminate with heat and under a pressure of at least one atmosphere.

Diallylic phthalate partial polymers, i.e., prepolymers, when cured have higher refractive indices than most reinforcing glasses. These propolymers are mixed with polymerizable liquids, whose refractive indices when cured are lower than that of the reinforcing glass, to match the refractive index of the polymer systems when cured, to the refractive index of a selected glass. The ratio of prepolymer to polymerizable liquid is determined from the refractive index of a selected reinforcing glass. When the refractive index of a reinforcing glass is high, the ratio of prepolymer to polymerizable liquid must be high; and when the refractive index of a reinforcing glass is low, the ratio of prepolymer to polymerizable liquid must be low to match the refractive index of cured polymer system to the refractive index of a selected reinforcing glass. Some trial and error experiments are generally necessary to match the refractive index of a cured polymer system to the refractive index of a selected reinforcing glass.

While not wishing to be held to any particular theory or mechanism of reaction, it is believed that incorporation of the coupling agent in the resin composition as well as applying it to the glass, improves the resin to glass bonding. The addition of an inhibitor promotes flow of the diallylic phthalate composition and reduces exotherm so that crazing and checking at the interface between the cured polymer and the glass does not occur.

Description of the invention and preferred embodiments

The major resinous component of compositions of this invention is diallylic phthalate resin. By "diallylic phthalate" we mean diallyl esters of ortho- and iso-phthalic acids. These diallylic phthalates polymerize by addition polymerization through the allylic unsaturation, first forming a partial polymer dissolved in unreacted monomer. On further polymerization of this partial polymer solution, gelation of the medium occurs during which the partial polymer is crosslinked to an infusible, insoluble, thermosetting resin.

In the manufacture of diallyl phthalate prepolymers, the monomeric materials polymerize in conventional fashion, to produce a solution of a soluble polymer in the monomer, to a point short of gelation, which occurs when the molecular weight of the polymer reaches a point where it is insoluble in the monomer. These materials are generally used in the form of their prepolymers. The polymer solutions (called "dopes") are separated into the solvent-soluble prepolymer fraction and monomer (such isolated solvent-soluble partial polymers are described by Heiberger in U.S. Patent No. 3,096,310). This separation may be done by treatment with a solvent which dissolves the monomer while precipitating the polymer by other means which will leave a soluble prepolymer substantially free of monomer. A typical method for separating these polymers is described by Willard in U.S. Patent No. 3,030,341, issued Apr. 17, 1962. These polymers are solids containing little or no monomers; they can be stored indefinitely in this form, since they require catalyst and either heat or actinic light to convert them to the insoluble stage. Diallyl orthophthalate and diallyl isophthalate are both produced by this general method.

The monomers useful in practicing this invention are diallyl maleate, ethylene glycol dimethacrylate, methyl methacrylate.

High maleic or fumaric content polyesters may be used in place of the monomers in practicing this invention. Such polyesters are described in a paper by J. Litwin, H. H. Beacham and C. W. Johnston entitled, "Heat Resistant Diallyl Phthalate Polyesters" published in the "Proceedings 18th Annual Technical and Management Conference, Reinforced Plastics Division of The Society of the Plastics Industry" (1963). The resins useful in this invention are those containing maleic or fumaric acids as fifty mol percent or higher of the total dibasic acid content of the polyester.

The glass coupling agents incorporated in the polymer compositions of this invention include the generally used coupling agents that are applied on reinforcing glass and are known in the trade as "finishes." The preferred coupling agents are silane coupling agents, such as gamma-methacryloxypropyltrimethoxy silane and tris(butoxyethoxy) vinyl silane. There is no advantage in using more than about 5% by weight of the glass coupling agent, based on the weight of the polymer system, while at least about 1% is required. Preferably the glass coupling agent is present in an amount of about 1–3%.

The polymer system should also contain a catalytic amount of an organic peroxide to catalyze the final cure of the resin. There is no advantage in using more than about 5% by weight of peroxide, based on the polymer system, while at least about 0.5% is required for complete cure. Preferably, the peroxide is present in an amount of about 2–3%. Useful peroxides include diacyl peroxides such as benzoyl peroxide, p-chlorobenzoyl peroxide, 2,4-di-chlorobenzoyl peroxide, lauroyl peroxide, and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-menthane hydroperoxide, pinane hydroperoxide, cumene hydroperoxide and 2,5-dimethylhexane-2,5-dihydroperoxide, peroxy esters such as tert.-butyl perbenzoate, 2,5-dimethylhexane-2,5-di(peroxybenzoate), ditert.-butyl diperpthalate, tert.-butyl peracetate, tert.-butyl peroxyisobutyrate and isopropyl percarbonate, as well as many other organic peroxides which have been described in the literature.

Inhibitors useful in practicing this invention are hydroquinone, tertiarylbutyl catechol, ditertiarybutyl phenol, hydroquinone monomethyl ether, tertiarybutyl hydroquinone and other inhibitors well known in the art to suppress the exotherming of diallylic phthalate compositions. Inhibitors are not required in practicing this invention; however, the preferred compositions contain an inhibitor.

The novel resin compositions of this invention may be used to prepare molding compositions. The molding compositions may be pre-mixed and they can be granular or fibrous in nature. The molding compositions are prepared in conventional equipment well known in the industry to be useful in compounding diallyl phthalate and polyester molding compounds. The allylic polymer, monomer or low phthalic polyester, treated reinforcing glass, a glass coupling agent, inhibitor, and catalyst are simply mixed together in a heavy duty mixer. The mixing may be done with or without the use of solvents. However, if solvents are used, they must be removed from the pre-mixed compound before molding. The glass contents of the molding compositions vary depending upon the form of the filler, i.e., whether fibrous, ground, or flake up to about 70% by weight of the total composition. An internal release agent may be used in the molding compositions and may be any of the fatty acids or salts of fatty acids commonly used in diallyl phthalate molding compounds. Lauric acid is the preferred internal release agent. An internal release agent is preferred but is not a critical or limiting element of the invention. The molding compositions of this invention are molded under conditions normally used for allylic molding compositions, i.e., they are molded at from about 130 to 180° C., at about 150 to about 2000 p.s.i.; for about 1 to 5 minutes.

The novel resin compositions of this invention are readily used in preparing glass reinforced laminates by either the wet lay-up or prepreg techniques. The usual process for the manufacture of glass-reinforced plastic laminates by the wet lay-up process is to pour the uncured, or incompletely cured, resin system containing the allylic polymer, monomer or high maleic or fumaric polyester, inhibitor, coupling agent, and catalyst onto one or more layers of a fibrous non-woven glass mat or woven glass fabric which has been treated with a coupling agent. After impregnation, the product is cured with heat and under mild pressure according to procedures well known in the art. A typical slow cure is effected by placing the wet layup in a vacuum bag and applying a vacuum of 28 to 29.5 inches of mercury for 5 hours to remove bubbles; the evacuated layup is then pressed at 30 to 50 p.s.i. (pounds per square inch) for 30 minutes at 82° C., 60 minutes at 104° C., 30 minutes at 141° C., 15 minutes at 149° C., and then cured an additional 60 minutes at 149° C. in a laminating press under contact pressure. Thin sections can be cured more rapidly; for example, at 30 to 50 p.s.i. for 60 minutes at 149° C. The amount of glass in the layup can be as high as 80% and the preferred amount of reinforcing glass is 50 to 75%.

The usual process for manufacture of glass-resin reinforced laminates using the prepreg technique is to impregnate a fibrous non-woven glass mat or a woven glass fabric which has been treated with a coupling agent, with our novel resin compositions which contain a diallylic phthalate polymer, a monomer or low phthalic content polyester, inhibitor, glass coupling agent, and catalyst. The use of some solvent may be required in order to reduce the viscosity level of the resin composition to make it suitable for application to the glass fabric with conventional equipment. Prepregs are generally most economically processed with 30-50 parts of the resin composition dispersed in either acetone, methyl ethyl ketone, methyl isobutyl ketones or blends of methyl ethyl ketone with toluene in proportions of 95–5 parts respectively.

The glass mat or fabric is impregnated from the solvent solution and then dried to remove the solvent. Glass roving is similarly pre-impregnated for processing by filament winding techniques into pipe and other cylinderical objects. After impregnation and drying the laminate is laid up and cured with heat and mild pressure using cure cycles and conditions used for curing wet lay-ups. Products made by filament winding are cured at about 150° C. in about 60 minutes. The glass content of the prepreg laminates generally amounts to 60 to 70% of the total weight of the cured laminate. The glass content of filament wound constructions such as pipe is generally 70 to 80% of the total weight of the cured product.

The following typical formulations are illustrative of this invention and are given by way of example and not by way of limitation. All parts and percentages herein are by weight.

EXAMPLE 1

A saturating solution was prepared according to the following formulation:

| | Parts by weight |
| --- | --- |
| Diallyl isophthalate polymer | 60 |
| Diallyl maleate monomer | 40 |
| Silane coupling agent (gamma-methacryloxypropyl trimethoxy silane) | 3 |
| Hydroquinone, p.p.m.[1] | 75 |
| Dicumyl peroxide | 3 |
| Acetone solvent | 80 |

[1] Parts per million based on the weight of the prepolymer and monomer.

The formulation was blended together and used to saturate glass veiling (thin non-woven glass fabric) on which the silane coupling agent had been applied. Seven layers of the saturated glass were laid up, placed in a vacuum bag and a vacuum of about 29 inches of mercury was applied for a period of 5 hours to remove bubbles. The laminate was then pressed at 30 p.s.i. for 30 minutes at 82° C., 60 minutes at 104° C., 30 minutes at 141° C., 15 minutes at 149° C., and then cured in a laminating press under contact pressure for 60 minutes at 149° C. The laminate after cooling was clear and was found to have a refractive index of 1.549 to 1.550.

EXAMPLE 2

Example 1 was repeated using tertiary butyl perbenzoate in place of the dicumyl peroxide catalyst. The refractive indices of this sample were 1.549.

EXAMPLE 3

Example 1 was repeated except that this sample was pressed at 100 p.s.i. during the cure cycle. The sample was clear and after cooling was found to have an index of refraction of 1.550.

EXAMPLE 4

A saturating solution was prepared containing the following materials:

| | Parts by weight |
| --- | --- |
| Diallyl isophthalate prepolymer | 60 |
| Ethylene glycol dimethacrylate | 40 |
| Silane coupling agent (gamma-methacryloxypropyl trimethoxy silane) | 1.5 |
| Hydroquinone, p.p.m.[1] | 75 |
| Dicumyl peroxide | 3 |

[1] Parts per million based on the weight of the prepolymer and monomer.

The formula was blended and used to saturate glass veiling on which a silane coupling agent had been applied. Seven layers of glass were laid up, placed in a vacuum bag and a vacuum of 28 to 29 inches of mercury was applied to remove bubbles; after 5 hours under vacuum the sample was pressed at 50 p.s.i. for 3 hours at 82° C., 3 hours at 107° C., 3 hours at 141° C., after which the laminate was allowed to cool in the press overnight. The laminate was found to have a refractive index of 1.5480.

EXAMPLE 5

A saturating solution was prepared containing the following materials:

| | Parts by weight |
| --- | --- |
| Diallyl isophthalate prepolymer | 60 |
| Ethylene glycol dimethacrylate | 20 |
| Diallyl maleate monomer | 20 |
| Silane coupling agent (gamma-methacryloxypropyl trimethoxy silane) | 5 |
| Tertiary butyl perbenzoate | 1.5 |
| Methylethyl ketone peroxide | 1.5 |
| Hydroquinone, p.p.m.[1] | 75 |

[1] Parts per million based on the weight of the prepolymer and monomer.

The formula was blended together and used to saturate glass veiling on which a chrome complex coupling agent had been applied. Seven layers of glass were laid up, placed in a vacuum bag and a vacuum of about 28 to 29 inches of mercury was applied to remove bubbles; after 5 hours under vacuum the sample was pressed at 50 p.s.i. for 3 hours at 82° C., 3 hours at 109° C., 2 hours at 141° C., and then cooled in the press overnight. The sample had a refractive index of 1.5485.

EXAMPLE 6

Sixty-five parts of the blended formula of Example 5 was mixed with 35 parts by weight of glass flake filler that had been treated with a silane coupling agent to form a granular premix molding compound. This pre-mix molding compound was molded at 150° C., for five minutes at 1000 p.s.i. Upon cooling the sample was found to have a refractive index of 1.5485, and was clear.

EXAMPLE 7

Fifty parts of the saturating solution from Example 5 was mixed with 50 parts of acetone to make a solvent diluted saturating solution. Glass veiling which had been treated with a silane coupling agent was saturated in the solution and then air-dried 48 hours to remove the acetone solvent. The impregnated cloth was cut into 9 inch by 12 inch sections and 7 ply were stacked up to make a laminate. The sample was laminated at a pressure of 150 p.s.i. at 160° C., for 30 minutes. When cooled the sample was clear and had a refractive index of 1.548.

EXAMPLE 8

Example 7 was repeated using 30 parts of the formula from Example 5 and 70 parts of acetone. Similar results were obtained.

EXAMPLE 9

A polyester was prepared by cooking together phthalic and maleic anhydrides at a mole ratio of 2:1 with a ten percent molar excess of diethylene glycol until an acid value of five was obtained. Excess glycol was removed by vacuum distillation. The resin was then cooled and cut with an equal weight of diallyl phthalate monomer. Sixty parts of this blend were then combined with 40 parts diallyl isophthalate polymer and sixty parts of acetone solvent to form a clear solution. To the solution were added three parts gamma-methacryloxypropyl trimethoxy silane, 75 p.p.m. tert-butylhydroquinone (based on total resin) and three parts tert-butylperbenzoate.

"E" glass roving (75 single filaments approximately 0.20 mil diameter no twist and treated with chrome complex finish) was drawn through the above solution then solvent removed in a circulating air oven. Resin add-on after drying was approximately 25 percent.

This was wound on a cylindrical mandrel to form a three-ply wound pipe. This was overwrapped with Mylar film and cured in an oven at 170° C., for 30 minutes. Resin flow out was excellent and a nearly transparent cylindrical tube resulted on removal of the mandrel. Refraction index of the resin was 1.5485.

Polyesters containing maleic or fumaric acids as 50 mol percent or higher of the total dibasic acid content of the polyester and in which the alcohol moiety of the polyester is derived from a saturated, difunctional, glycol containing 2–8 carbon atoms can be substituted for the maleic-diethylene glycol polyester of this example with similar results.

As will be apparent to those skilled in the art, numerous modifications and variations of the embodiments illustrated above may be made without departing from the spirit of the invention or the scope of the following claims.

What is claimed is:

1. A modified, thermosetting, diallylic phthalate polymer composition useful for producing transparent glass reinforced moldings and laminates comprising: (a) a diallylic phthalate partial polymer selected from the group consisting of partial polymers of diallyl phthalate and diallyl isophthalate; (b) a polymerizable liquid, in an amount sufficient to match the refractive index of the cured polymer system to the refractive index of glass, selected from the group consisting of diallyl maleate, ethylene glycol dimethacrylate and polyesters of maleic and fumaric acid, diluted with 25 to 50% by weight of a diallylic phthalate monomer, and in which the alcohol moiety of the polyester is derived from a saturated, difunctional glycol containing 2 to 8 carbon atoms; (c) at least 1% of a glass coupling agent, by weight based on the weight of the total polymer composition; and (d) a catalyst in concentration sufficient to convert the polymer composition to the insoluble state at the curing temperature.

2. The modified, thermosetting, diallylic phthalate polymer composition of claim 1 in which the glass coupling agent is selected from the group consisting of gamma-methacryloxypropyl trimethoxysilane and tris(butoxyethoxy)vinylsilane.

3. The modified, thermosetting, diallylic phthalate polymer composition of claim 1 in which the glass coupling agent is gamma-methacryloxypropyl trimethoxysilane.

4. The modified, thermosetting, diallylic phthalate polymer composition of claim 1 further comprising up to about 400 parts per million of an inhibitor for the polymer composition based on the total weight of the polymer and polymerizable liquid.

5. The modified, thermosetting, diallylic phthalate polymer composition of claim 4 in which the inhibitor is selected from the group consisting of hydroquinone, tertiarybutyl catechol, ditertiarybutylphenol, hydroquinone monomethylether and tertiarybutylhydroquinone.

6. A diallylic phthalate polymer-impregnated glass fabric prepreg useful for making transparent laminates comprising: (a) glass fabric on which a glass coupling agent had been applied; (b) a diallylic phthalate partial polymer selected from the group consisting of partial polymers of the diallyl esters of orthophthalic acid and isophthalic acid; (c) a polymerizable liquid, in an amount sufficient to match the refractive index of the cured polymer-polymerizable liquid mixture to the refractive index of the glass fabric, selected from the group consisting of diallyl maleate, ethylene glycol dimethacrylate, and polyesters of maleic and fumaric acid, diluted with 25 to 50% by weight of a diallylic phthalate monomer, and in which the alcohol moiety of the polyester is derived from a saturated, difunctional glycol-containing 2 to 8 carbons atoms; (d) about 1–5% of a glass coupling agent, by weight based on the weight of polymer-polymerizable liquid mixture, and (e) a catalyst in sufficient concentration to convert the polymer system to the insoluble state at the laminating temperature.

7. The diallylic phthalate of polymer-impregnated glass fabric prepreg of claim 6 in which the glass coupling agent is selected from the group consisting of gamma-methacryloxypropyl trimethoxysilane and tris(butoxyethoxy)vinylsilane.

8. The diallylic phthalate polymer-impregnated glass fabric prepreg of claim 6 in which the glass coupling agent is gamma-methacryloxypropyl trimethoxysilane.

9. The diallylic phthalate polymer-impregnated glass fabric prepreg of claim 6 further comprising up to about 400 parts per million of an inhibitor for the polymer composition based on the total weight of the polymer and polymerizable liquid.

10. The diallylic phthalate polymer-impregnated glass fabric prepreg of claim 9 in which the inhibitor is selected from the group consisting of hydroquinone, tertiarybutyl catechol, ditertiarybutyl phenol, hydroquinone monomethylether and tertiarybutylhydroquinone.

11. A transparent, glass reinformed, diallylic phthalate resin laminate comprising a plurality of glass fabric sheets selected from the group consisting of non-woven glass fabric sheets and woven glass fabric sheets, on which a glass coupling agent has been applied, impregnated with a thermoset resin composition derived from a diallylic phthalate polymer selected from the group consisting of diallyl ortho-phthalate and diallyl isophthalate polymers, a polymerizable liquid, in an amount sufficient to match the refractive index of the thermoset resin to the refractive index of glass, and selected from the group consisting of diallyl maleate, ethylene glycol dimethacrylate, and polyesters of maleic and fumaric acid, diluted with 25% to 50% by weight of a diallylic phthalate monomer, and in which the alcohol moiety of the polyester is derived from a saturated, difunctional glycol containing 2 to 8 carbon atoms, and about 1–5% by weight based on the total weight of the polymer and polymerizable liquid, of a glass coupling agent, laminated together.

12. The glass reinforced, diallylic phthalate resin laminate of claim 11 in which the glass coupling agent is selected from the group consisting of gamma-methacryloxypropyl trimethoxysilane and tris(butoxyethoxy)vinylsilane.

13. A modified, diallylic phthalate molding composition useful for making transparent moldings comprising: (a) reinforcing glass selected from the group consisting of glass fibers, glass flake and ground glass on which a glass coupling agent had been applied; (b) diallylic phthalate partial polymer selected from the group consisting of partial polymers of diallyl esters of orthophthalic acid and iso-phthalic acid; (c) a polymerizable liquid, in an amount sufficient to match the refractive index of the cured polymer system to the refractive index of the reinforcing glass, selected from the group consisting of diallyl maleate, ethylene glycol dimethacrylate, and polyesters of maleic and fumaric acid, diluted with 25 to 50% by weight of a diallylic phthalate monomer, and in which the alcohol moiety of the polyester is derived from a saturated, difunctional glycol containing 2 to 8 carbon atoms; (d) about 1–5% of a glass coupling agent, by weight based on the weight of the polymer-polymerizable liquid mixture; and (e) a catalyst in sufficient concentration to convert the polymer system to the insoluble state at the molding temperature.

14. The glass reinforced, modified, diallylic phthalate molding composition of claim 13 in which the glass coupling agent is selected from the group consisting of gamma-methacryloxypropyl trimethoxysilane and tris(butoxyethoxy)vinylsilane.

15. The glass reinforced, modified, diallylic phthalate molding composition of claim 13 further comprising 0 to 400 parts per million of an inhibitor for the polymer-polymerizable liquid mixture based on the weight of the polymer-polymerizable liquid mixture.

16. A transparent, glass reinforced, diallylic phthalate resin molding comprising: (a) reinforcing glass selected from the group consisting of glass fibers, glass flakes and ground glass on which a glass coupling agent had been applied, (b) diallylic partial polymer selected from the group consisting of partial polymers of diallyl esters of ortho-phthalic acid and iso-phthalic acid, (c) a polymerizable liquid, in an amount sufficient to match the refractive index of the cured polymer system to the refractive index of the reinforcing glass, selected from the group consisting of diallyl maleate, ethylene glycol dimethacrylate and polyesters of maleic and fumaric acid, diluted with 25 to 50% by weight of a diallylic phthalate monomer, and in which the alcohol moiety of the polyester is derived from a saturated, difunctional glycol containing 2 to 8 carbon atoms; and (d) about 1–5% of a glass coupling agent, by weight based on the weight of polymer-polymerizable liquid mixture.

17. The transparent, glass reinforced, diallylic phthalate resin molding of claim 16 in which the glass coupling agent is selected from the group consisting of gamma-methacryloxypropyl trimethoxysilane and tris(butoxyethoxy)vinylsilane.

References Cited

UNITED STATES PATENTS 2,851,379  9/1958  Staudinger et al. __ 260—862 X
2,959,564  11/1960  Cypher et al. _____ 260—40 X
3,331,891  7/1967  Thomas et al. ____ 260—872 X

FOREIGN PATENTS 1,178,593  9/1964  Germany.

OTHER REFERENCES

Nowlin et al.: Diallyl phthalate monomer: Its properties, uses, and potential; SPE Journal; October 1961; pp. 1093–1096.

Sterman et al.: Silane coupling agents as integral blends in resin-filler systems; Modern Plastics; July 1963; pages 125, 127, 129, 130, 134, 136, 138, 177. Lib., TP 986.A2 M5.

ALLAN LIEBERMAN, *Primary Examiner.*

L. T. JACOBS, *Assistant Examiner.*

U.S. Cl. X.R.

260—861, 862, 872, 885